(12) United States Patent
Moriyama (10) Patent No.: US 10,971,999 B2
(45) Date of Patent: Apr. 6, 2021

(54) POWER SUPPLY APPARATUS AND IMAGE FORMING APPARATUS INCLUDING A CONTROLLER FOR CONTROLLING A CURRENT LIMITER

(71) Applicant: CANON KABUSHIKI KAISHA, Tokyo (JP)

(72) Inventor: Takumi Moriyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/002,043

(22) Filed: Jun. 7, 2018

(65) Prior Publication Data

US 2018/0358889 A1 Dec. 13, 2018

(30) Foreign Application Priority Data

Jun. 12, 2017 (JP) .............................. JP2017-115267

(51) Int. Cl.
*H02M 1/42* (2007.01)
*H02M 3/335* (2006.01)
*G03G 15/00* (2006.01)

(52) U.S. Cl.
CPC ..... *H02M 1/4258* (2013.01); *H02M 3/33523* (2013.01); *G03G 15/5004* (2013.01)

(58) Field of Classification Search
CPC ... H02M 3/335–42; H02M 2001/0009; H02M 1/4258; H02M 1/36; G03G 15/80; G03G 15/5004

See application file for complete search history.

(56) References Cited

U.S. PATENT DOCUMENTS

| | | | | |
|---|---|---|---|---|
| 6,163,712 A | * | 12/2000 | Winkler | H02H 9/001 323/908 |
| 8,422,179 B2 | * | 4/2013 | Zhan | H02H 9/002 361/18 |
| 2003/0107859 A1 | * | 6/2003 | Pan | H02H 9/001 361/58 |
| 2004/0174152 A1 | * | 9/2004 | Hwang | H02M 1/4225 323/284 |
| 2010/0166449 A1 | * | 7/2010 | Hong | G03G 15/5004 399/88 |

(Continued)

FOREIGN PATENT DOCUMENTS

JP H11-212408 A 8/1999
JP 2005-323453 A 11/2005

*Primary Examiner* — Peter M Novak
(74) *Attorney, Agent, or Firm* — Venable LLP (57) ABSTRACT

Provided is a power supply apparatus, which is capable of saving power at the time of low output power even in a configuration using an inrush current prevention resistor and a switch as an inrush current prevention circuit in order to increase power of a low power supply. An AC/DC power supply includes a rectifier configured to rectify an input AC voltage, a smoothing capacitor configured to smooth the rectified voltage, a resistor configured to limit an inrush current input to the smoothing capacitor, a relay configured to control whether to input a current to the resistor, and a current detection circuit. The AC/DC power supply further includes a converter connected at the subsequent stage of the smoothing capacitor and configured to adjust the voltage smoothed by the smoothing capacitor to a predetermined voltage.

3 Claims, 7 Drawing Sheets

(56) References Cited

U.S. PATENT DOCUMENTS

2013/0021702 A1\* 1/2013 Waltman ................ H02H 3/24
 361/91.1
2013/0257301 A1\* 10/2013 Tran ..................... H02M 5/458
 315/200 R \* cited by examiner

| OPERATION MODE | RELAY OF INRUSH CURRENT PREVENTION CIRCUIT |
|---|---|
| SLEEP | OFF |
| STANDBY | ON |
| COPY | ON |

| OPERATION MODE | PFC | RELAY OF INRUSH CURRENT PREVENTION CIRCUIT |
|---|---|---|
| SLEEP | OFF | OFF |
| STANDBY | ON | ON |
| COPY | ON | ON |

PRIOR ART

FIG. 11

POWER SUPPLY APPARATUS AND IMAGE FORMING APPARATUS INCLUDING A CONTROLLER FOR CONTROLLING A CURRENT LIMITER

BACKGROUND OF THE INVENTION

Field of the Invention

The present disclosure relates to an inrush current prevention circuit in a power supply apparatus and an image forming apparatus.

Description of the Related Art

In electrical devices, in order to supply power to each load, an AC/DC power supply is mounted and configured to convert an AC voltage into a DC voltage. In the AC/DC power supply (power supply apparatus), a diode bridge is used to rectify an AC voltage supplied from a commercial power supply, and a smoothing capacitor is used to smooth the rectified voltage. After that, a transformer is used to charge a secondary-side capacitor, and thus a DC voltage is generated. A circuit configured to detect an output voltage of the AC/DC power supply is provided on the secondary side, and a primary-side switching element is driven so that the output voltage becomes a predetermined value. Thus, a current flowing through the transformer is controlled.

In the AC/DC power supply, when the AC voltage supplied from the commercial power supply is input to the AC/DC power supply, a large current flows in order to charge the smoothing capacitor. This current is called inrush current. This inrush current may cause damage to the diode bridge or other components. Therefore, a general AC/DC power supply includes an inrush current prevention circuit to suppress the inrush current.

Figure 11:
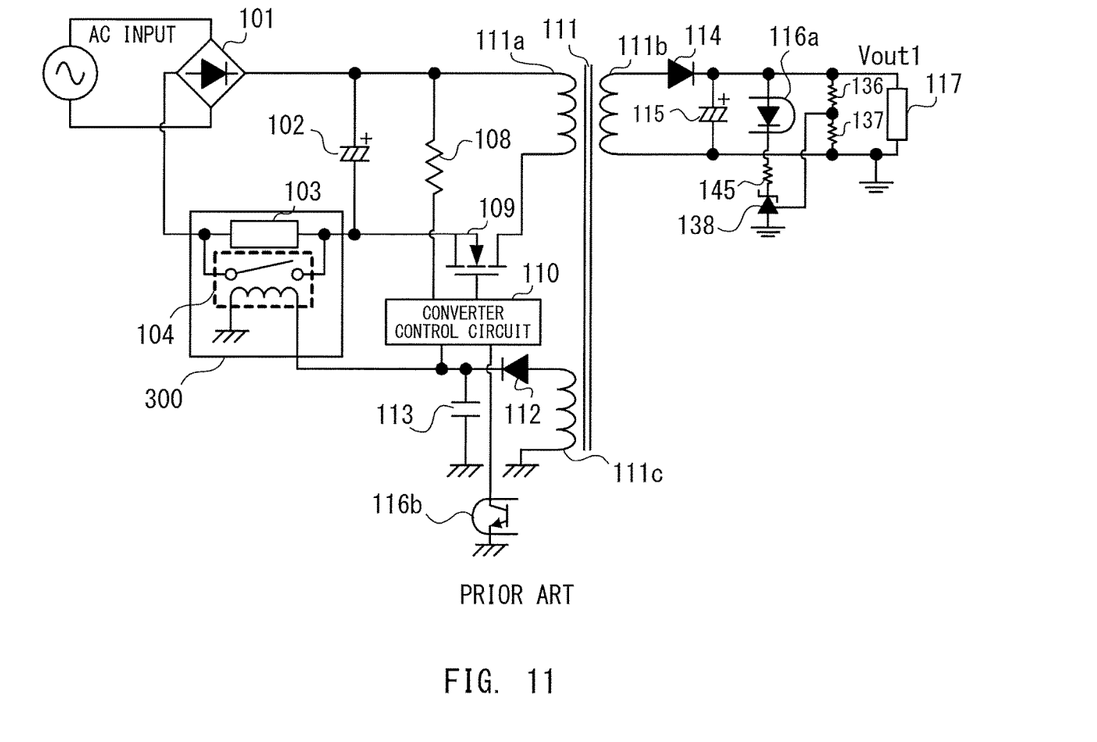
FIG. 11 is a diagram for illustrating a configuration example of a general inrush current prevention circuit included in a related-art AC/DC power supply.

FIG. 11 is a diagram for illustrating an example configuration of a general inrush current prevention circuit included in a related-art AC/DC power supply.

An inrush current prevention circuit 300 illustrated in FIG. 11 has a configuration in which an inrush current prevention resistor 103 and a switch 104 are arranged on an input side of the AC/DC power supply. The inrush current prevention resistor 103 is configured to suppress the inrush current. The switch 104, which may be a relay or a triac, is arranged in parallel to the inrush current prevention resistor 103. Now, an operation principle of the inrush current prevention circuit 300 will be described.

When the commercial power supply and the AC/DC power supply are connected to each other, an inrush current flows to charge a smoothing capacitor 102. At this time, the switch 104 is opened, and the inrush current prevention resistor 103 is connected in series to a current path through which the inrush current flows. This inrush current prevention resistor 103 limits the inrush current to a predetermined current value or less, and thus damage to a diode bridge 101 or other components can be prevented.

However, the inrush current prevention resistor 103 is only required to be present in the path through which the inrush current flows for a short period of time until the smoothing capacitor 102 is charged. Further, it is undesirable to keep the current flowing through the inrush current prevention resistor 103 after the smoothing capacitor 102 is charged from the viewpoint of power loss and heat generation.

Therefore, in the general inrush current prevention circuit 300, after the smoothing capacitor 102 is charged and a state in which no inrush current flows is achieved, the inrush current prevention resistor 103 is short-circuited by the switch 104 so that the current is prevented from flowing through the inrush current prevention resistor 103.

In the circuit configuration illustrated in FIG. 11, when power is supplied from the commercial power supply to the AC/DC power supply, simultaneous with the charging of the smoothing capacitor 102 power is supplied to a converter control circuit 110 via a start-up resistor 108 so that switching of a switching element 109 is started. With this switching, an AC current is caused to flow through a primary winding 111a of a transformer 111 so that power is supplied to the secondary side. The transformer 111 has an auxiliary winding 111c wound around the same core as the primary winding 111a and a secondary winding 111b. With the switching of the switching element 109, power is similarly supplied to elements connected to the subsequent stage of the auxiliary winding 111c.

In this manner, the switch 104 of the inrush current prevention circuit 300 is turned on (conductive state), and the inrush current prevention resistor 103 is short-circuited. The charging of the smoothing capacitor 102 is completed during a time period from when the current input to the AC/DC power supply is started to when the switch 104 is turned on, and hence the inrush current does not flow when the switch 104 is turned on.

As described above, the inrush current prevention circuit 300 has objects of "preventing damage of electrical components due to the inrush current caused immediately after a current is input to the AC/DC power supply" and "reducing power loss and heat generation due to the current flowing through the inrush current prevention resistor 103 after the smoothing capacitor 102 is charged".

In Japanese Patent Application Laid-open No. 2005-323453, the following circuit configuration is disclosed. An AC input voltage of the AC/DC power supply is detected. When the input voltage is interrupted, the switch 104 of the inrush current prevention circuit 300 is immediately turned off (interrupted state) to prevent the inrush current from flowing through the AC/DC power supply.

In Japanese Patent Application Laid-open No. Hei 11-212408, the following circuit configuration is disclosed. There are prepared a path in which the inrush current prevention resistor is present and a path in which the inrush current prevention resistor is absent when a DC voltage is supplied from the AC/DC power supply to a load. In this circuit configuration, power is first supplied through the path in which the inrush current prevention resistor is present, and the path is switched to the path in which the inrush current prevention resistor is absent after a certain time period elapses. In this manner the inrush current is suppressed.

In recent years, there is a need for electrical devices to save energy. For example, in an image forming apparatus, when a state in which no printing instruction is issued continues for a certain time period, an operation mode of the apparatus is automatically shifted to a sleep mode (power saving mode) so that the power consumption of the apparatus is reduced.

A sleep mode refers to a mode in which only a minimum circuit required for receiving the instruction of, for example, printing is operated, and operations of an HDD, an operation portion, and other components are stopped so that the power consumption is reduced. Therefore, the sleep mode has the smallest power consumption among the operation modes of the image forming apparatus.

There is a configuration of the AC/DC power supply for further reducing the power consumption of an apparatus in the sleep mode. For example, there is a configuration in which a low-power AC/DC power supply (low power supply) is configured to operate only the minimum load during the sleep mode and a large-power AC/DC power supply is configured to operate during a mode in which large power is required, for example, a print mode.

The low power supply is designed so as to always operate while the electrical device is connected to an outlet to achieve high efficiency even at the time of a light load.

Meanwhile, during the sleep mode, an operation of the large power supply is stopped in order to reduce the power consumption of the image forming apparatus. When the operation mode of the image forming apparatus is changed to a mode requiring large power consumption, the large power supply receives a signal from, for example, a controller of the apparatus to start its operation.

As described above, when only the low power supply is operated during the sleep mode, power loss caused in the large power supply can be reduced.

Meanwhile, in the image forming apparatus, in addition to the power saving during the sleep mode, responsiveness at the time of return from the sleep mode is also important. Therefore, how it is important that the image forming apparatus can quickly return from the sleep mode and complete the printing when a sleep return instruction is received without increasing the power consumption during the sleep mode.

In the configuration of the related-art AC/DC power supply, only the low power supply is operated during the sleep mode. Therefore, the large power supply is operated after the printing instruction is received, and then power is supplied to loads such as the operation portion, a calculation circuit, and a motor. In this case, time is required until the large power supply starts its operation, and thus time is required from the sleep return to the printing completion.

In order to enable return from the sleep mode at higher speed, it is necessary to increase the capacity of the low power supply to immediately supply power to the operation portion and the calculation circuit.

The power to be consumed by the image forming apparatus during printing cannot be entirely supplied only by the low power supply, and hence the large power supply is also required. However, large power can be supplied to the operation portion and the calculation circuit from the low power supply before the large power supply is operated, and hence the operation from the sleep return to the printing completion can be performed at higher speed. As described above, the low power supply also has increasing needs of larger power in addition to higher efficiency at the time of light load.

When the power of the low power supply is increased, as the inrush current prevention circuit, a configuration including an inrush current prevention resistor and a switch is required to be employed. A thermistor, which has been used in the low-power AC/DC power supply as the low power supply in the related art, cannot be used. The reason for this is as follows. It is difficult to design the large-power AC/DC power supply having a large inrush current to have a circuit configuration that can withstand the inrush current at the time when the thermistor has a high temperature, for example, at the time when the power is re-input. However, when a configuration including an inrush current prevention resistor and a switch is employed as the inrush current prevention circuit of the low power supply, there still remains an issue in that large power is consumed when the output power of the low power supply is small, for example, during the sleep mode.

The inrush current prevention circuit has a configuration in which, after the smoothing capacitor is charged, the inrush current prevention resistor is short-circuited by the switch in order to reduce the power loss at the inrush current prevention resistor. The power consumption is reduced with this configuration, but the power consumption may not always be reduced with this configuration in the low power supply at the time of low output power. This is because even the switch for short-circuiting the inrush current prevention resistor consumes power.

For example, when a relay is used as the switch, the power consumed by the relay is about 0.5 W. In the AC/DC power supply having large output power, the input current is large, and hence the power loss is increased when the current is kept flowing through the inrush current prevention resistor. Therefore, although the switch consumes 0.5 W, an operation of turning on the switch to short-circuit the inrush current prevention resistor is effective to reduce the power consumption.

However, in the case of the low power supply at the time of low output power, for example, when the output power is several hundreds of milliwatts, the input current is also small, and hence the consumed power is as small as several tens of milliwatts even when the input current flows through the inrush current prevention resistor. Therefore, the operation of keeping the switch of the inrush current prevention circuit in the ON state while consuming 0.5 W in the low power supply at the time of low output power has an adverse effect from the viewpoint of power consumption.

In the inrush current prevention circuits disclosed in Japanese Patent Application Laid-open No. 2005-323453 and Japanese Patent Application Laid-open No. Hei 11-212408, the switch of the inrush current prevention circuit that is once turned on is not turned off until the electrical device is powered off or a power plug is pulled out. During an operation mode in which the output power of the AC/DC power supply is small, for example, in the sleep mode of the image forming apparatus, power is wasted by keeping the switch of the inrush current prevention circuit in the ON state, and the power saving cannot be achieved.

SUMMARY OF THE INVENTION

A power supply apparatus according to the present disclosure, which is configured to convert an AC voltage input from an AC power supply into a DC voltage, includes: a rectifier configured to rectify the input AC voltage; a capacitor configured to smooth the rectified voltage; a current limiter configured to limit a current input to the capacitor; a converter, which is connected at a subsequent stage of the capacitor, and is configured to adjust the voltage smoothed by the capacitor to a predetermined voltage; and a controller configured to control whether to enable the current limiter based on output power of the power supply apparatus.

Further features of the present disclosure will become apparent from the following description of exemplary embodiments (with reference to the attached drawings).

DESCRIPTION OF THE EMBODIMENTS

Embodiments of the present disclosure are described in detail with reference to the drawings. In the embodiments below, descriptions are given of examples of a power supply apparatus to which the present disclosure is applied, and an image forming apparatus as an example of an electrical device including the power supply apparatus. However, the electrical device to which the present disclosure is applied is not limited to the described power supply apparatus and image forming apparatus.

First Embodiment

Figure 1:
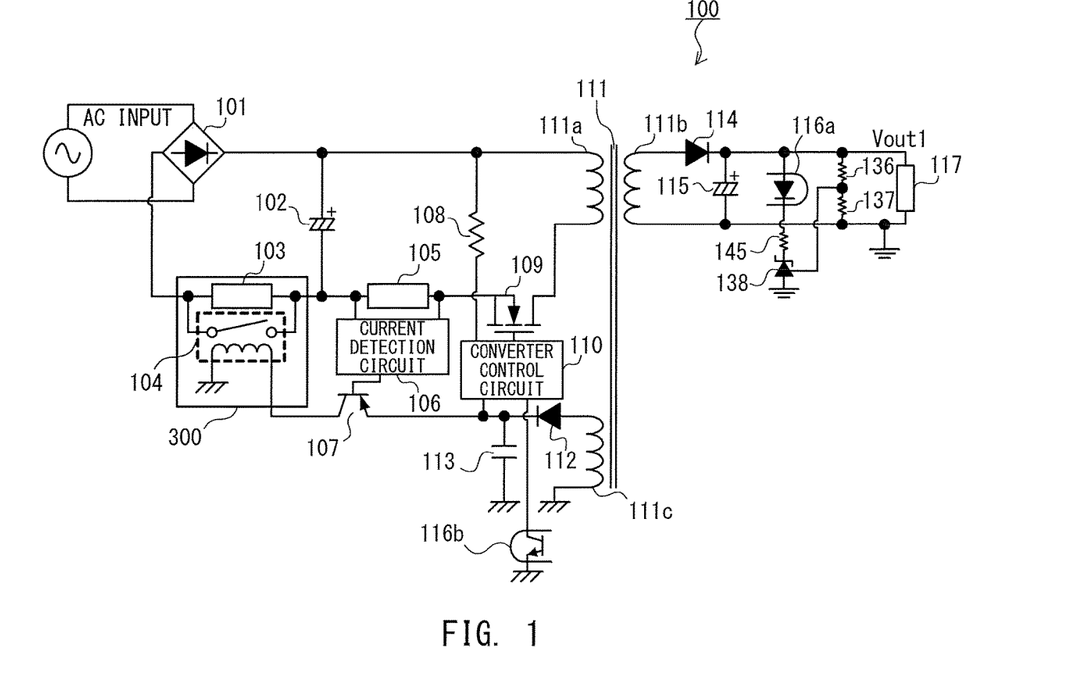
FIG. 1 is a schematic configuration diagram for illustrating an example of a configuration of a power supply apparatus according to a first embodiment of the present disclosure.

FIG. 1 is a schematic configuration diagram illustrating an example of a configuration of a power supply apparatus according to a first embodiment of the present disclosure.

An AC/DC power supply 100 corresponding to the power supply apparatus illustrated in FIG. 1 converts an AC voltage input from an AC power supply (commercial power supply) into a DC voltage to output the DC voltage. A basic operation principle of the AC/DC power supply 100 will now be described.

The AC current input to the AC/DC power supply 100 is rectified by a diode bridge 101, which is an example of a rectifier, and a smoothing capacitor 102 is charged by the rectified current. In this manner, a DC voltage is generated across both terminals of the smoothing capacitor 102. The DC voltage supplies power to a converter control circuit 110 via a start-up resistor 108.

The converter control circuit 110 starts output of a switching signal for a switching element 109 connected in series between the smoothing capacitor 102 and a transformer 111.

With this switching, an AC current flows through a primary winding 111a of the transformer 111 arranged at the subsequent stage of the smoothing capacitor 102.

Then, with this AC current, a voltage corresponding to a winding ratio of the transformer is generated at a secondary winding 111b. On the secondary side, a secondary-side rectifier diode 114 and a secondary-side smoothing capacitor 115 and a load 117 are arranged. The voltage is rectified by the secondary-side rectifier diode 114 and is then smoothed by the secondary-side smoothing capacitor 115. Therefore, a DC voltage is generated across both terminals of the secondary-side smoothing capacitor 115. The voltage generated across both the terminals of the secondary-side smoothing capacitor 115 becomes an output voltage Vout1 of the AC/DC power supply 100.

Further, in order to stabilize the output voltage to a certain value, the output voltage Vout1 is fed back to the converter control circuit 110 via resistors 136 and 137, a shunt regulator 138, a register 145, and a photocoupler 116. The output voltage Vout1 is divided by the resistors 136 and 137 to be input to the shunt regulator 138.

The shunt regulator 138 increases a current flowing through a light emitting diode 116a when a voltage input through resistor voltage division is higher than a reference voltage, and decreases the current flowing through the light emitting diode 116a when the input voltage is lower than the reference voltage.

The light emitting diode 116a emits light at an intensity corresponding to the magnitude of the flowing current, and turns on a phototransistor 116b in an electrically-insulated state (the light emitting diode 116a and the phototransistor 116b are the photocoupler 116 included in the same package). A current corresponding to the received light amount flows through a collector of the phototransistor 116b.

As described above, the output voltage of the AC/DC power supply 100 is fed back to the converter control circuit 110 via the photocoupler 116. Further, the converter control circuit 110 controls a duty ratio of the switching element 109 so that the output voltage of the AC/DC power supply 100 is adjusted to a certain value.

For example, when the output voltage of the AC/DC power supply 100 is decreased, the ON time of the switching is increased because a larger amount of power is required to be supplied to the secondary side, and thus the current flowing through the primary winding 111a of the transformer is increased.

Further, an auxiliary winding 111c is wound around the same core as the primary winding 111a and the secondary winding 111b of the transformer, and a voltage is also generated in the auxiliary winding 111c simultaneously with the start of switching of the switching element 109. With this voltage, a current flows through a diode 112 to charge a capacitor 113, and hence a DC voltage is generated across both terminals of the capacitor 113.

The voltage of the capacitor 113 becomes a power supply source for the converter control circuit 110. When the DC voltage generated across both the terminals of the capacitor 113 is supplied as a power supply source, the converter control circuit 110 controls the operation in the converter control circuit 110 so that power that has been supplied from the smoothing capacitor 102 via the start-up resistor 108 is interrupted. Next, an example of an operation of an inrush current prevention circuit 300 will be described.

The AC/DC power supply 100 includes a current detection circuit 106 configured to control of a relay 104 included in the inrush current prevention circuit 300 between an ON state (conductive state) or an OFF state (interrupted state).

Further, the time to turn on the relay 104 of the inrush current prevention circuit 300 is determined based on the input current of the AC/DC power supply 100. In order to detect the input current, the AC/DC power supply 100 includes a current detection resistor 105, which functions as a current detector. The current detection circuit 106 functions as a controller configured to control whether or not to enable the operation of an inrush current prevention resistor 103 (i.e., whether or not to cause a current to flow).

The input current depends on the output power of the AC/DC power supply 100. As the output power of the AC/DC power supply 100 is increased, the input current is also increased. Further, as the output power of the AC/DC power supply 100 is decreased, the input current is also decreased. Therefore, the ON/OFF of the relay 104 may be controlled based on the output power from the AC/DC power supply 100.

In the AC/DC power supply 100 illustrated in FIG. 1, the current detection resistor 105 configured to detect the switching current of the converter is arranged on the primary side of the AC/DC power supply 100, and the change of the input current is detected based on a voltage generated across both terminals of the current detection resistor 105.

In the first embodiment, when a current value detected at the current detection resistor 105 is less than a first current value (less than a first threshold value), the relay 104 is maintained in the OFF state so that the function of the inrush current prevention circuit 300 is enabled. Further, when the current value is equal to or more than the first current value (equal to or more than the first threshold value), the relay 104 is controlled to be turned on so that the function of the inrush current prevention circuit 300 is disabled.

Figure 2:
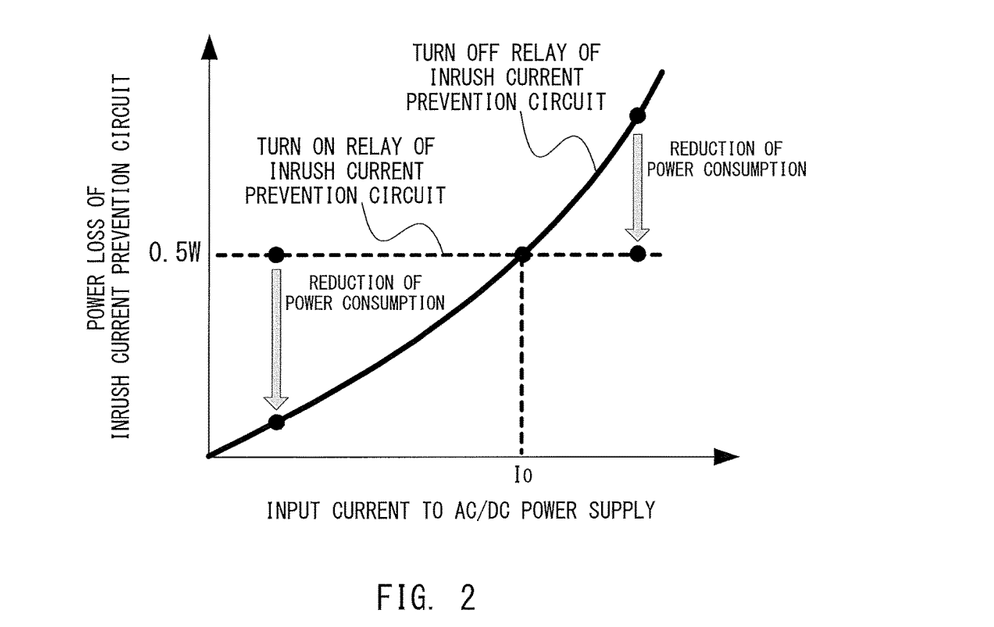
FIG. 2 is a graph for showing an example of a procedure of determining a first current value (first threshold value).

FIG. 2 is a graph for showing an example of a procedure of determining the first current value (first threshold value). In the graph of FIG. 2, the vertical axis represents the power loss of the inrush current prevention circuit 300, and the horizontal axis represents the input current to the AC/DC power supply 100.

In this case, it is assumed that, for example, the relay 104 of the inrush current prevention circuit 300 is in the OFF state. When the relay 104 of the inrush current prevention circuit 300 is in the OFF state, the input current to the AC/DC power supply 100 flows through the inrush current prevention resistor 103 configured to limit the inrush current to the capacitor. Therefore, the power consumption of the inrush current prevention circuit 300 is proportional to the square of the input current. In this case, as indicated by the solid line in FIG. 2, the power loss caused in the inrush current prevention circuit 300 varies depending on the input current of the AC/DC power supply 100.

Next, it is assumed that the relay 104 of the inrush current prevention circuit 300 is in the ON state. In this case, the inrush current prevention resistor 103 is short-circuited by the relay 104, and hence power is not lost due to the current flowing through the inrush current prevention resistor 103. However, power of about 0.5 W is required to turn on the relay 104. This power is constant regardless of the input current of the AC/DC power supply 100 as indicated by the broken line of FIG. 2.

In view of the above-described considerations, as shown in the graph of FIG. 2, the power consumption can be reduced when the relay 104 of the inrush current prevention circuit 300 is turned off until the input current of the AC/DC power supply 100 exceeds a certain fixed value (I0). Further, the power consumption can be reduced when the relay 104 of the inrush current prevention circuit 300 is turned on after the input current exceeds I0.

The value of I0 is set as the first current value (first threshold value). In a state in which the current detected at the current detection resistor 105 exceeds the first current value (I0), the relay 104 of the inrush current prevention circuit 300 is set to the ON state.

As described above, the power loss in the inrush current prevention circuit 300 can be reduced by controlling the operation of the AC/DC power supply 100. Now, an example of a procedure of determining the value of I0 will be described.

The input current to the AC/DC power supply 100 at the time when the relay 104 of the inrush current prevention circuit 300 is in the OFF state, that is, when the input current flows through the inrush current prevention resistor 103, is represented by Iin. At this time, the power consumption of the inrush current prevention circuit 300 can be represented by (power consumption)=Iin×Iin×R, where R (unit: Ω) represents a resistance of the inrush current prevention resistor 103.

The input current Iin at the time when this power consumption becomes equal to the power consumption of 0.5 W at the time when the relay 104 of the inrush current prevention circuit 300 is in the ON state corresponds to I0. Therefore, I0 can be represented by Expression (1) when the inrush current prevention resistor 103 has a resistance of 10Ω.

$$I0=\sqrt{(0.5 \text{ W}/10\Omega)}=0.22 \text{ A} \qquad \text{Expression (1)}$$

Input power Pin to the AC/DC power supply 100 at this time can be represented by Expression (2) when the input voltage is 100 V.

$$P\text{in}=100 \text{ V}*0.22 \text{ A}=22 \text{ W} \qquad \text{Expression (2)}$$

Further, output power Pout can be represented by Expression (3) when the efficiency of the AC/DC power supply 100 is 85%.

$$P\text{out}=22 \text{ W}*0.85=18.7 \text{ W} \qquad \text{Expression (3)}$$

Based on the above calculations, when the first current value is set to 0.22 A, and the relay 104 of the inrush current prevention circuit 300 is turned on when the current detected at the current detection resistor 105 exceeds the first current value, the power loss in the inrush current prevention circuit 300 can be reduced.

Specifically, in the case of I0=0.22 A, the relay 104 of the inrush current prevention circuit 300 is controlled to be turned on when the output power of the AC/DC power supply 100 exceeds 18.7 W.

The first current value is not limited to J0, for example, the first current value may be set to a value that is smaller than J0 when a rated current or heat generation of the inrush current prevention resistor 103 is not desirable.

Next, it is assumed that the relay 104 of the inrush current prevention circuit 300 is in the ON state, and the input current to the AC/DC power supply 100 is decreased (output power is reduced).

In this case, when the current detected at the current detection resistor 105 is equal to or less than a second current value (equal to or less than a second threshold value), the relay 104 of the inrush current prevention circuit 300 is controlled to be turned off so that the input current flows through the inrush current prevention resistor 103 again.

The reason why such control is performed is because, when the input current of the AC/DC power supply 100 is decreased to be smaller than the second current value, the power loss caused by the input current flowing through the inrush current prevention resistor 103 becomes less than the power loss caused by keeping the relay 104 in the ON state.

The second current value (second threshold value) is set to a value that is less than the first current value in order to prevent the ON/OFF of the relay 104 of the inrush current prevention circuit 300 from being frequently switched in response to the variation of the current detected at the current detection resistor 105. Specifically, for example, a hysteresis characteristic is provided to ON/OFF of a switch 107.

As described above, the AC/DC power supply 100 according to the first embodiment switches the relay 104 of the inrush current prevention circuit 300, which has been kept in the ON state even after the smoothing capacitor 102 is charged in the related art, based on the input current to the AC/DC power supply 100 (output power of the AC/DC power supply 100). In this manner, the power loss caused in the inrush current prevention circuit 300 can be reduced.

In the first embodiment, the current detection resistor 105 is connected in series between the smoothing capacitor 102 and the switching element 109 to detect the change of the input current to the AC/DC power supply 100 based on the switching current of the converter, but the present disclosure is not limited to such a configuration.

For example, the current detection resistor 105 can be arranged at any position as long as parameters that change in accordance with the input current (current flowing through the inrush current prevention resistor 103) can be detected.

Further, the current detection resistor 105 may be connected in series between the commercial power supply and the diode bridge 101, or may be arranged on the secondary side of the AC/DC power supply 100 to detect the output current. Further, although the relay is described as the switch 104 of the inrush current prevention circuit 300, a semiconductor element (semiconductor switch), for example, a triac, may be used instead.

Second Embodiment

Description will now be given of an example of an image forming apparatus including an AC/DC power supply 400 corresponding to a power supply apparatus of the present disclosure.

Figure 3:
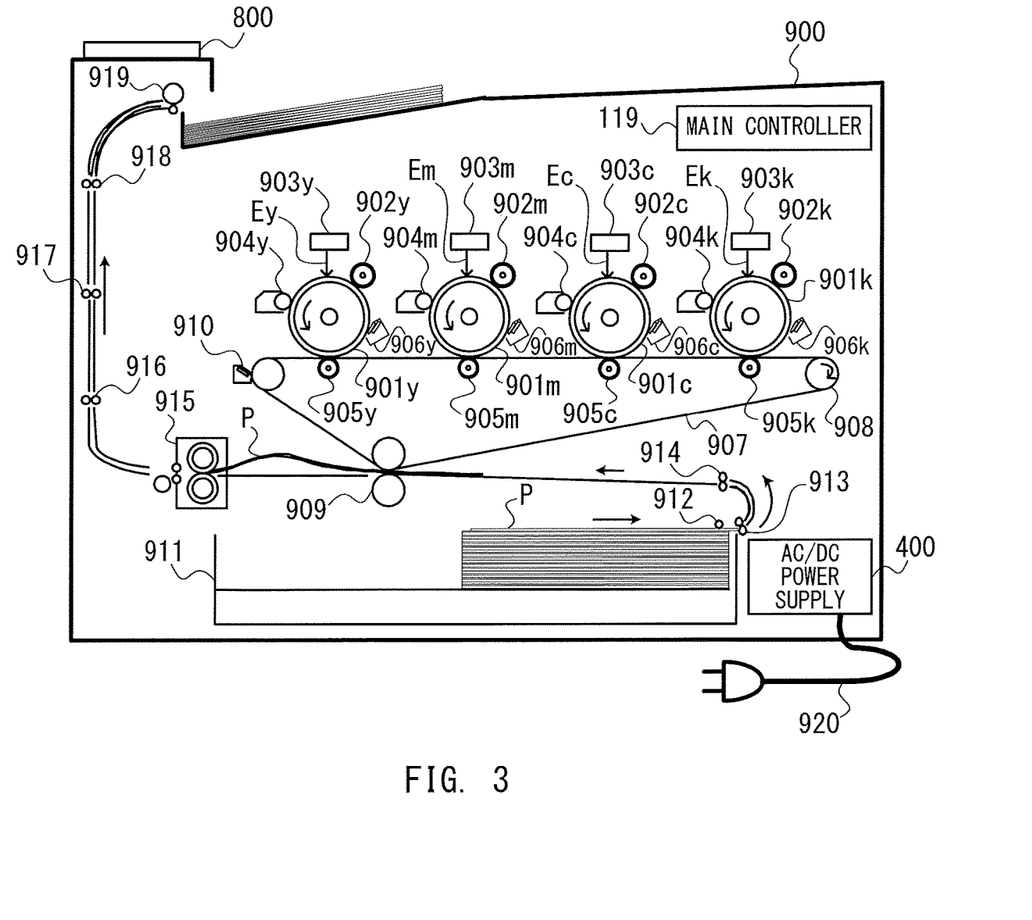
FIG. 3 is a schematic vertical sectional view for illustrating an example of a configuration of an image forming apparatus according to a second embodiment of the present disclosure.

FIG. 3 is a schematic vertical sectional view for illustrating an example of a configuration of the image forming apparatus including the AC/DC power supply 400 and a power cord 920.

An image forming apparatus 900 forms an image on a recording material P, for example, paper, by an electrophotographic process.

The image forming apparatus 900 forms a full-color image on the recording material P with use of toner of the colors yellow, magenta, cyan, and black. Symbols y, m, c, and k added to ends of reference numerals in various configurations illustrated in FIG. 3 indicate image forming portions for yellow, magenta, cyan, and black, respectively. The image forming processes of the four colors are the same, and hence description is given below with the symbols of y, m, c, and k being omitted.

An instruction from a user to operate the image forming apparatus 900 is transmitted to a main controller 119 via a network or an operation portion 800. The main controller 119 is configured to control an operation of the entire image forming apparatus 900. An operation of each load performed along with the image formation described below is controlled based on a signal from the main controller 119.

When the main controller 119 receives an instruction from the user to start printing, the main controller 119 controls the drive of each of a photosensitive drum 901, a developing device 904, an intermediate transfer belt drive roller 908, and fixing rollers 915 such that each member rotates at a predetermined speed.

The photosensitive drum 901 is rotated in a direction of the arrow in FIG. 3, and a toner image is formed on the surface of the drum during the rotation process.

The toner image is formed as follows. A charging roller 902 charges the photosensitive drum 901 so that the surface of the photosensitive drum 901 has a uniform potential, and an exposure device 903 irradiates the photosensitive drum 901 with laser light E modified based on image data to be printed. Thus, a latent image is formed on the surface of the photosensitive drum 901. After that, the developing device 904, to which a high voltage is applied, develops the latent image formed on the surface of the photosensitive drum 901 with use of toner.

The toner image formed on the photosensitive drum 901 is transferred onto an intermediate transfer belt 907 by a primary transfer roller 905. After the transfer, the toner remaining on the photosensitive drum 901 is scraped by a photosensitive drum cleaner 906, and an image forming process is restarted from the charging by the charging roller 902. The above-mentioned process is similarly performed for each of the four-color toners, and thus a full-color toner image is formed on the intermediate transfer belt 907.

Further, the recording material P is fed from a sheet feeding cassette 911 at a predetermined time from when a printing instruction is transmitted to the main controller 119.

The recording material P is fed as follows. A pick-up roller 912 conveys the recording material P to sheet feeding rollers 913. The sheet feeding rollers 913 prevent a plurality of recording materials P from being conveyed in an overlapping manner by applying a force to the recording material P in a sheet conveyance direction by an upper roller and in a direction of the pick-up roller 912 by a lower roller.

In registration rollers 914, the recording material P is stopped in a curved state in order to prevent skewing of the recording material P, and the recording material P is re-conveyed at a time at which the toner image formed on the intermediate transfer belt 907 passes through secondary transfer rollers 909.

Further, a high voltage is applied to the secondary transfer rollers 909. When the toner image formed on the intermediate transfer belt 907 and the recording material P simultaneously pass through the secondary transfer rollers 909, the toner image is transferred onto the recording material P. After the transfer, the toner remaining on the intermediate transfer belt 907 without being transferred onto the recording material P is scraped by an intermediate transfer belt cleaner 910 so as to be prevented from affecting the following image formation. The toner image transferred onto the recording material P is heated and pressurized by the fixing rollers 915, and thus the toner image is fixed onto the recording material P.

Then, the recording material P having the image formed thereon is discharged to the outside of the image forming apparatus 900 via conveyance rollers 916, 917, 918, and 919.

As described above, in order to cause the image forming apparatus 900 to execute the image forming operation, power is required to be supplied to a calculation device, sensors, motors, a high-voltage power supply, and other components. As a power supply source therefor, the image forming apparatus 900 includes the AC/DC power supply 400 configured to convert an AC voltage input from the commercial power supply into a DC voltage.

The image forming apparatus 900 has operation modes (power modes) related to various types of power supply depending. For example, there can be three modes: a sleep mode, a standby mode, and a print mode.

Description is given below assuming that the image forming apparatus 900 according to the second embodiment has the above-mentioned three operation modes.

The sleep mode is a mode in which the image forming apparatus 900 operates at the smallest power consumption (for example, 5 W or less). Only the calculation circuit for receiving the printing instruction is operated, and operations of the other loads are stopped. Therefore, a relatively long time period is required from the reception of the printing instruction until the printing can be started.

The standby mode is a state in which the image forming apparatus 900 can start printing in a short time period when the image forming apparatus 900 receives a printing instruction, and has power consumption that is larger than that in the sleep mode (for example, from 100 W to 200 W). However, the time period required from the reception of the printing instruction until the printing can be started can be reduced.

The print mode is a state in which an image is being formed on the recording material P, and power is supplied to all loads required for forming an image. Therefore, the largest power is consumed (for example, 1,500 W).

The operation modes are changed depending on the instruction from the user or the elapsed time (standby time).

Figure 4:
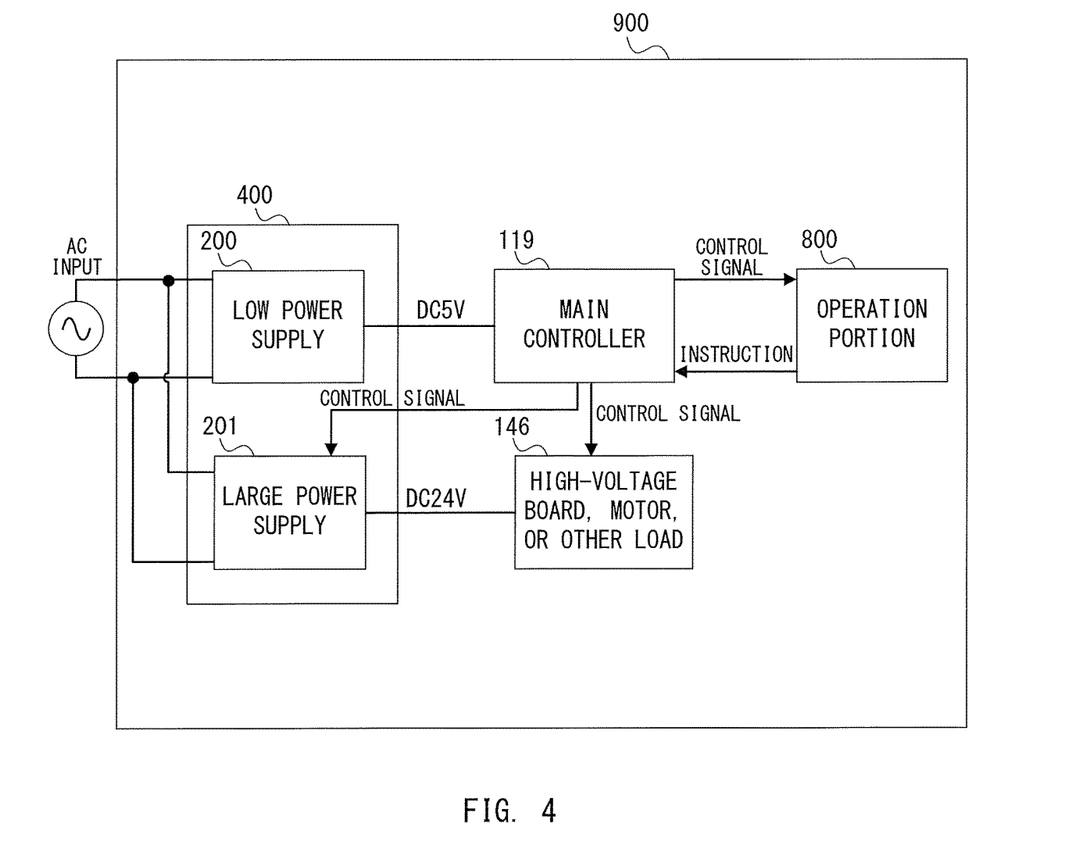
FIG. 4 is a diagram illustrating an example of a functional configuration of an AC/DC power supply included in the image forming apparatus.

FIG. 4 is a diagram for illustrating an example of a functional configuration of the AC/DC power supply 400 included in the image forming apparatus 900.

The AC/DC power supply 400 included in the image forming apparatus 900 includes a low power supply 200 configured to always operate while the image forming apparatus 900 is connected to an outlet. The AC/DC power supply 400 further includes a large power supply 201 configured to operate only when the image forming apparatus 900 is changed to a mode requiring large power consumption. The low power supply 200 supplies power to the main controller 119 including a calculation circuit, for example, a CPU. Further, the large power supply 201 supplies power to a load 146 having a large power specification, for example, a high-voltage board or a motor.

The large power supply 201 is controlled to stop its operation in order to reduce the power consumption when the operation mode of the image forming apparatus 900 is the sleep mode. Further, the large power supply 201 is controlled to start its operation when the operation mode of the image forming apparatus 900 is changed to the standby mode or the print mode. The main controller 119 outputs a signal (control signal) for controlling the operation of the large power supply 201 or the operation of each load (for example, the load 146) included in the image forming apparatus 900 based on the instruction from the user via the operation portion 800 or the network.

Figure 5:
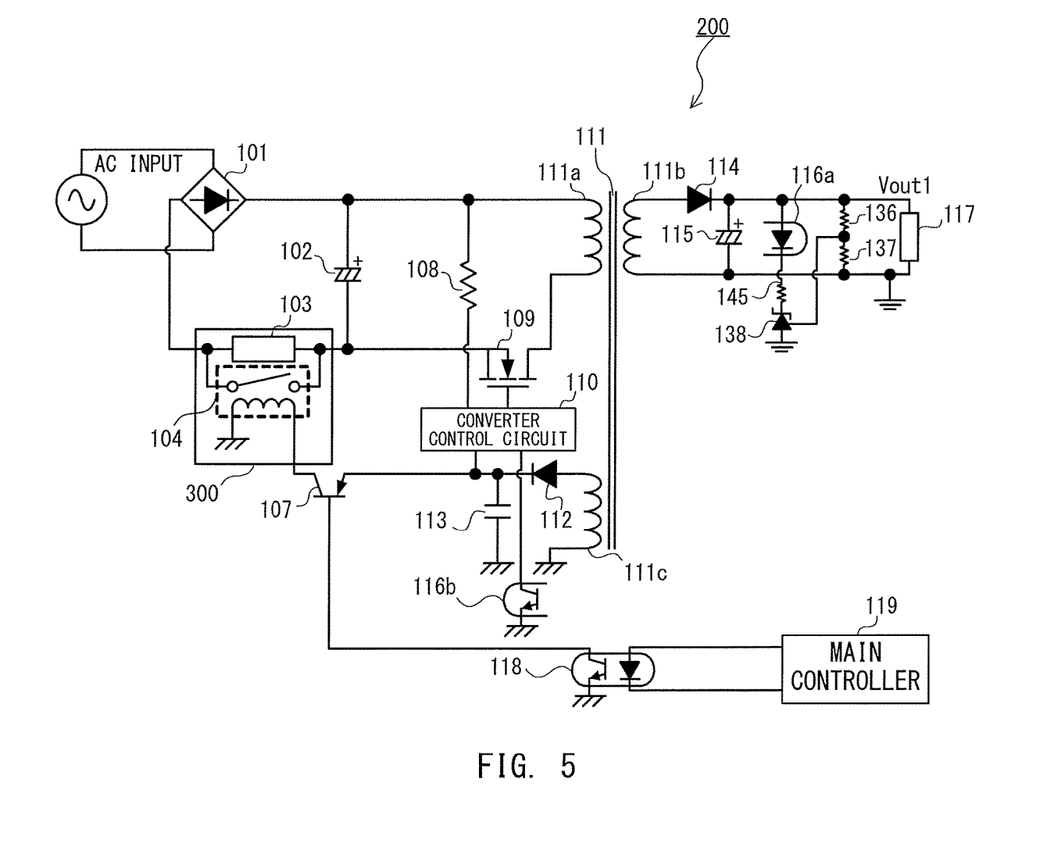
FIG. 5 is a diagram illustrating a functional configuration of a low power supply.

FIG. 5 is a diagram illustrating an example of a functional configuration of the low power supply 200.

Components having like functional configurations as those of the AC/DC power supply 100 described in the first embodiment are denoted by like reference symbols, and description thereof is omitted.

The AC/DC power supply 400 (low power supply 200) includes the inrush current prevention circuit 300 to prevent the diode bridge 101 or other components from being damaged by the inrush current.

In the image forming apparatus 900 of the second embodiment, the ON/OFF of the relay 104 of the inrush current prevention circuit 300 is switched based on the operation mode of the image forming apparatus.

The main controller 119 controls the operation of the switch 107 configured to switch the ON/OFF of the relay 104. Specifically, the main controller 119 outputs a signal that is based on the operation mode of the image forming apparatus 900 to the switch 107 via a photocoupler 118.

Figure 6:
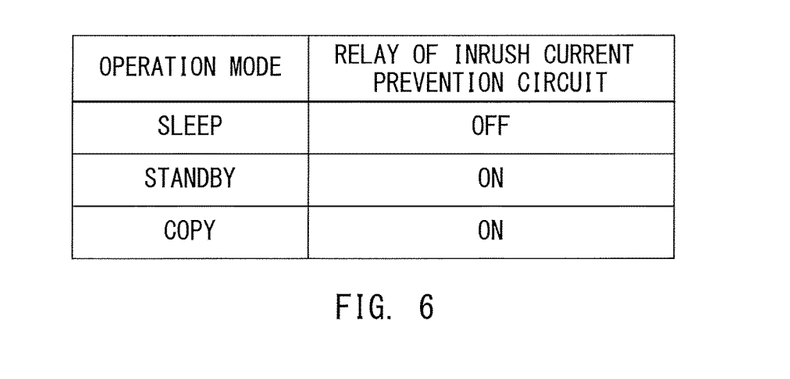
FIG. 6 is a table in which an operation mode of the image forming apparatus and a state (ON or OFF) of a relay of an inrush current prevention circuit are associated with each other.

The operation mode of the image forming apparatus 900 and the control of the ON/OFF of the relay 104 of the inrush current prevention circuit 300 are based on the correspondence table shown in FIG. 6.

FIG. 6 is a table in which the operation mode of the image forming apparatus 900 and the state (ON or OFF) of the relay 104 of the inrush current prevention circuit 300 are associated with each other.

When the operation mode of the image forming apparatus 900 is the sleep mode (first operation mode (first power mode)), the main controller 119 outputs a signal for turning off the relay 104 of the inrush current prevention circuit 300.

When the operation mode of the image forming apparatus 900 is the first operation mode, the input current to the AC/DC power supply 400 is small (for example, several tens of milliamperes). Therefore, the power loss caused when the input current passes through the inrush current prevention resistor 103 is less than that caused when the relay 104 of the inrush current prevention circuit 300 is kept in the ON state. That is, at the time of the first operation mode, power consumption can be reduced when the relay 104 of the inrush current prevention circuit 300 is turned off so that the input current is kept flowing through the inrush current prevention resistor 103.

Further, when the operation mode of the image forming apparatus 900 is changed to the standby mode or the print mode (second operation mode (second power mode)), the main controller 119 outputs a signal for turning on the relay 104 of the inrush current prevention circuit 300.

When the operation mode of the image forming apparatus 900 is the second operation mode, the output power of the AC/DC power supply 100 is large, and hence the input current is also large (for example, several amperes to ten and several amperes). Therefore, power loss is increased when the input current is kept flowing through the inrush current prevention resistor 103.

That is, at the time of the second operation mode, the power consumption can be reduced by turning on the relay 104 to short-circuit the inrush current prevention resistor 103.

Further, when the operation mode of the image forming apparatus 900 is changed to the sleep mode again, the main controller 119 outputs a signal for turning off the relay 104 of the inrush current prevention circuit 300.

As described above, the main controller 119 outputs a signal for controlling the ON/OFF of the relay 104 of the inrush current prevention circuit 300 to the switch 107 based on the operation mode of the image forming apparatus 900.

A processing procedure of controlling the state of the relay 104 of the inrush current prevention circuit 300 to the ON state or the OFF state will now be described.

Figure 7:
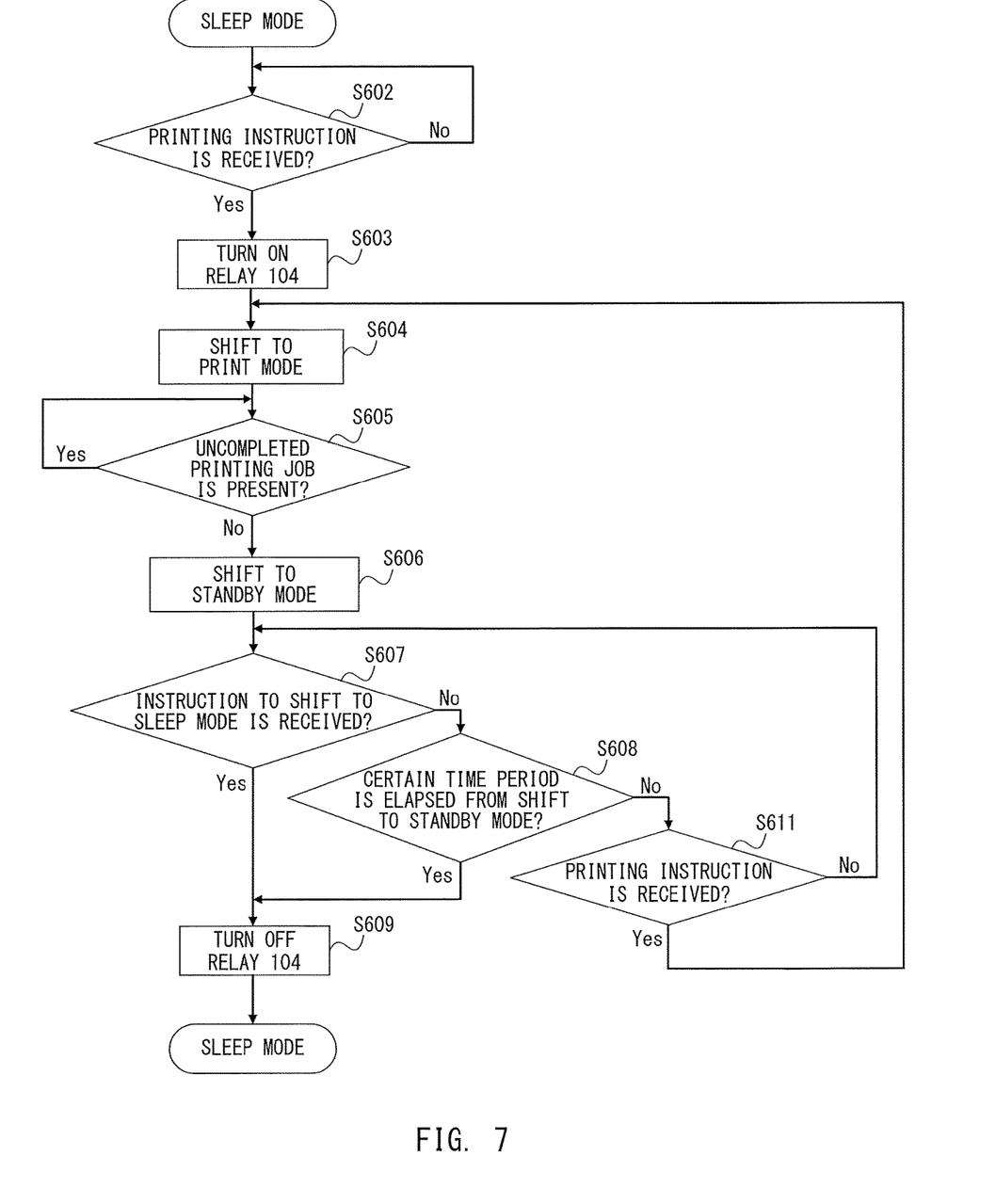
FIG. 7 is a flow chart illustrating an example of a processing procedure of controlling an operation of the image forming apparatus.

FIG. 7 is a flow chart for illustrating an example of the processing procedure of controlling the operation of the image forming apparatus 900.

More specifically, FIG. 7 is an illustration of a processing procedure during a period in which the image forming apparatus 900 receives a printing instruction in the sleep mode to shift to the print mode, and then the image forming apparatus 900 performs image formation and returns to the sleep mode. Further, each step of processing illustrated in FIG. 7 is mainly executed by the main controller 119. Still further, as an initial state, when the operation mode of the image forming apparatus 900 is the sleep mode, the relay 104 is in the OFF state.

The main controller 119 determines whether or not the printing instruction is received from the user (Step S602). When the main controller 119 determines that the printing instruction is not received (Step S602: No), the main controller 119 maintains the sleep mode. Otherwise (Step S602: Yes), the main controller 119 turns on the relay 104 (Step S603), and shifts the operation mode of the image forming apparatus 900 to the print mode (Step S604).

The main controller 119 determines whether or not a job instructed from the user is completed (Step S605). When the main controller 119 determines that the job is not completed (Step S605: Yes), the print mode is maintained. During this period, the relay 104 is still in the ON state. In each embodiment, information representing a series of image forming operations performed to one or a plurality of sheets along with the instruction to start the image forming operation is referred to as "job".

When the main controller 119 determines that the job instructed from the user is completed (Step S605: No), the main controller 119 shifts the operation mode of the image forming apparatus 900 to the standby mode (Step S606). The relay 104 is still in the ON state while the image forming apparatus 900 operates in the standby mode.

The main controller 119 determines whether or not an instruction to shift the operation mode of the image forming apparatus 900 to the sleep mode is received from the user (Step S607). When the shift instruction is received (Step S607: Yes), the main controller 119 turns off the relay 104 (Step S609), and shifts the operation mode of the image forming apparatus 900 to the sleep mode. In this case, the image forming apparatus 900 returns to the initial state.

When the shift instruction is not received (Step S607: No), the main controller 119 determines whether or not a certain time period has elapsed from when the operation mode is shifted to the standby mode (Step S608). That is, the operation mode is automatically shifted to the sleep mode when a certain time period has elapsed from when the operation mode is shifted to the standby mode.

When the main controller 119 determines that a certain time period has not elapsed (Step S608: No), the main controller 119 determines whether or not a printing instruction is received from the user (Step S611). When the printing instruction is received (Step S611: Yes), the processing returns to Step S604. In this case, the image forming apparatus 900 operates in the print mode until the instructed job is completed again. Otherwise (Step S611: No), the processing returns to Step S607. In that case, the image forming apparatus 900 operates in the standby mode until the image forming apparatus 900 enters the sleep mode again.

When the main controller 119 determines that a certain time period has elapsed (Step S608: Yes), the main controller 119 turns off the relay 104 (Step S609), and shifts the operation mode of the image forming apparatus 900 to the sleep mode.

As described above, the relay 104 is controlled to be turned off when the operation mode of the image forming apparatus 900 is the sleep mode, and is controlled to be turned on when the operation mode is the standby mode or the print mode.

As described above, the image forming apparatus 900 according to the second embodiment changes the state of the relay 104 of the inrush current prevention circuit 300, which has been kept in the ON state after the smoothing capacitor 102 is charged in the related art, based on the operation mode of the apparatus. In this manner, power loss caused in the inrush current prevention circuit 300 can be reduced.

In the second embodiment, the relay 104 of the inrush current prevention circuit 300 is turned off in the sleep mode, and is turned on in the standby mode and the print mode, but the relationship between the operation mode of the apparatus and the ON/OFF of the relay 104 is not limited.

For example, when the input current of the AC/DC power supply at the time of the standby mode is small (as an example, 0.22 A or less described in the first embodiment, or 18.7 W or less when converted into output power), the relay 104 may be turned off even in the standby mode.

Third Embodiment

Now, a description is given of a low power supply that differs from the AC/DC power supply 400 (low power supply 200) of the second embodiment. Functional configurations that are the same as those of the AC/DC power supplies described in the first and second embodiments are denoted by like reference symbols, and description thereof is omitted.

Figure 8:
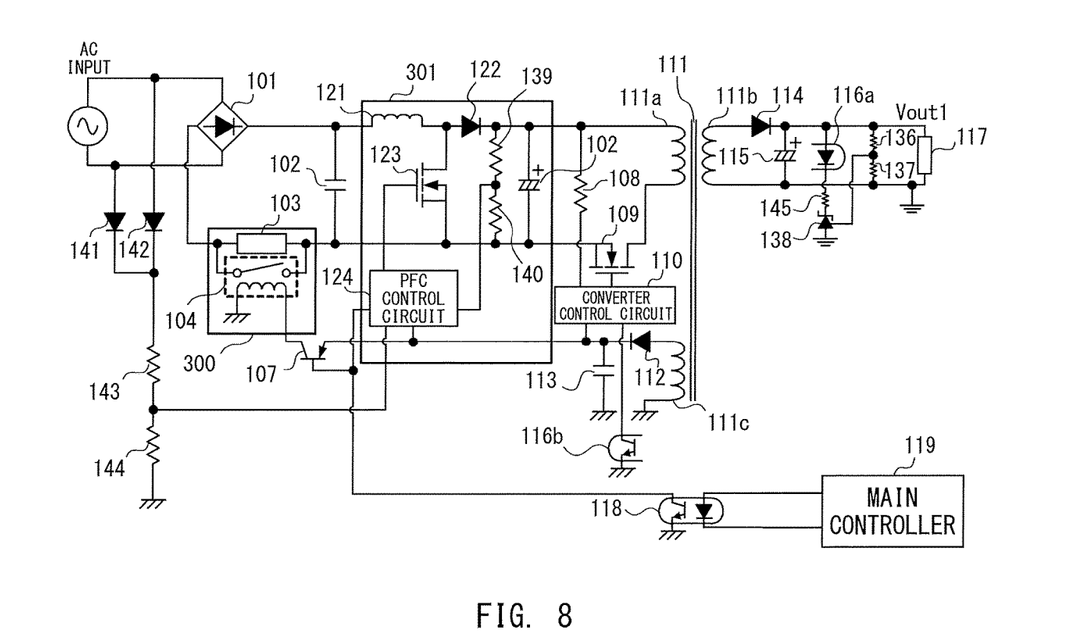
FIG. 8 is a diagram illustrating an example of a functional configuration of a low power supply in a third embodiment of the present disclosure.

FIG. 8 is a diagram illustrating an example of a functional configuration of a low power supply according to a third embodiment of the present invention.

The configuration of the low power supply illustrated in FIG. 8 differs from the configuration of the low power supply 200 illustrated in FIG. 5 in that the low power supply illustrated in FIG. 8 includes a power factor correction circuit (PFC circuit) 301 at the preceding stage of the converter unit.

The PFC circuit 301 is a booster circuit including a coil 121, a diode 122, and a switching element 123, and the circuit is used for correcting the power factor or addressing harmonics of the AC/DC power supply having a large input current.

In the PFC circuit 301, in order to stabilize the output voltage to a certain value, the output voltage of the PFC circuit 301 is divided by voltage detection resistors 139 and 140, and the divided voltage is fed back to a PFC control circuit 124.

The PFC control circuit 124 compares the fed-back voltage with a reference voltage. Further, the PFC control circuit 124 detects an input voltage waveform by diodes 141 and 142 and resistors 143 and 144. The PFC control circuit 124 controls the duty ratio of the switching element 123 so that the deviation between the fed-back voltage and the reference voltage is reduced and the input current waveform becomes a sine wave that is similar to the input voltage.

In general, the PFC circuit is used for an AC/DC power supply for large power, and is not required to be used for a low power supply for low power. However, the input current is increased when the power of the low power supply is increased, and hence even the low power supply is required to use the PFC circuit to correct the power factor and address harmonics.

Power consumption when the PFC circuit 301 is used at the time when the operation mode of the apparatus is the sleep mode is described below. The PFC circuit 301 is a circuit configured to boost a voltage by the switching of the switching element 123, and hence power is consumed in the switching operation and by the PFC control circuit 124 and the voltage detection resistors 139, 140, 143, and 144.

Meanwhile, the low power supply is an AC/DC power supply configured to operate even during the sleep mode. It is desirable for an image forming apparatus to save energy, and hence an increase in power consumption at the time of the sleep mode due to the increase in power loss of the low power supply is undesirable.

In view of this, as in the low power supply in the third embodiment, the operation of the PFC circuit 301 of the low power supply is stopped when the operation mode of the image forming apparatus 900 is the sleep mode. In this manner, the power loss caused in the switching element 123, the PFC control circuit 124, and the voltage detection resistors 139, 140, 143, and 144 can be reduced.

Further, the PFC circuit 301 must operate when the input current to the AC/DC power supply is large, but operation of the PFC circuit 301 is not required when the input current is small and the power factor and harmonics may have less influence. Therefore, in an operation mode in which the input current to the AC/DC power supply is small as in the sleep mode, the operation of the PFC circuit 301 can be stopped.

Meanwhile, when the image forming apparatus 900 is changed to an operation mode requiring large power consumption, the PFC circuit 301 is operated to address harmonics and correct the power factor.

The main controller 119 controls the PFC circuit 301 to operate or stop the operation. The main controller 119 outputs the ON/OFF signal for the PFC circuit 301 to the PFC control circuit 124 via the photocoupler 118 based on the operation mode of the image forming apparatus 900.

In the third embodiment, the ON/OFF of the relay 104 of the inrush current prevention circuit 300 in the low power supply is controlled with the same signal as the signal for controlling the ON/OFF of the PFC circuit 301; that is, operations of the relay 104 and the PFC circuit 301 are controlled by one signal. Further, the operation mode of the image forming apparatus 900, the ON/OFF of the PFC circuit 301, and the ON/OFF of the relay 104 of the inrush current prevention circuit 300 are based on the correspondence table shown in FIG. 9.

Figure 9:
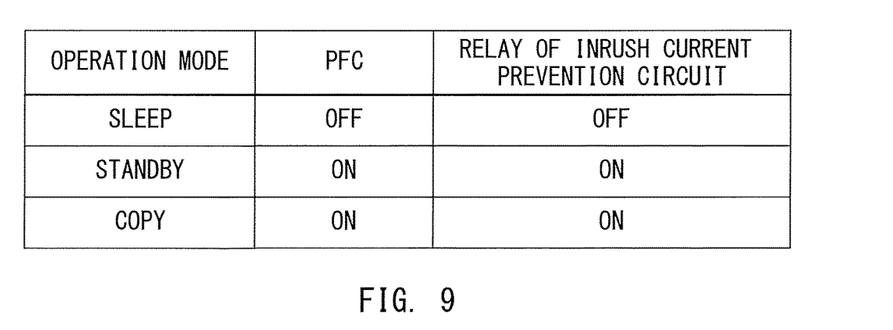
FIG. 9 is a table showing a state (ON/OFF) of a PFC circuit and the state (ON/OFF) of the relay based on the table of FIG. 6.

FIG. 9 is a table in which the operation mode of the image forming apparatus 900, the operation (ON/OFF) of the PFC circuit 301, and the operation (ON/OFF) of the relay 104 are associated with each other.

Figure 10:
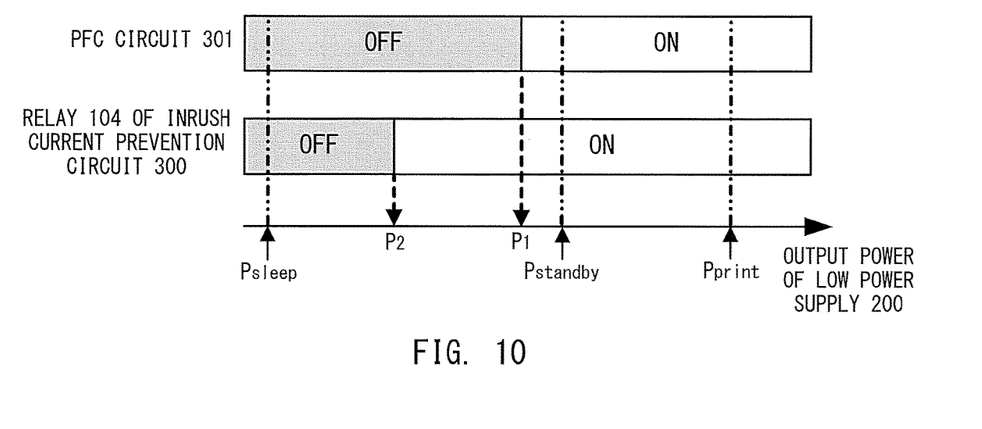
FIG. 10 is a graph showing correspondence among output power of the AC/DC power supply in each operation mode of the image forming apparatus, the ON/OFF of the PFC circuit, and the ON/OFF of the relay of the inrush current prevention circuit in the third embodiment of the present disclosure.

FIG. 10 is a graph showing the operation (ON/OFF) of the PFC circuit 301 and the operation (ON/OFF) of the relay 104 that are based on the correspondence table of FIG. 9.

The operation (ON/OFF) of the PFC circuit 301 and the operation (ON/OFF) of the relay 104 will be described with reference to FIG. 9 and FIG. 10.

When the output power of the low power supply 200 is large, the input current is large, and hence the PFC circuit 301 must be operated. However, when the output power of the low power supply 200 is small (equal to or less than P1), the input current is small, and thus operation of the PFC circuit 301 is not required.

In this case, when the output power of the low power supply 200 is equal to or less than P1, it is desirable to stop the PFC circuit 301 in order to reduce the power consumption.

In the relay 104 of the inrush current prevention circuit 300, when the output power of the low power supply 200 is large, the input current is large, and hence the relay is turned on to prevent the power loss caused when the input current flows through the inrush current prevention resistor 103.

However, when the output power of the low power supply 200 is small (equal to or less than P2), the input current is small, and hence the power consumed when the input current flows through the inrush current prevention resistor 103 is less than the power required for turning on the relay 104.

Therefore, when the output power of the low power supply 200 is equal to or less than P2, it is desirable that the relay 104 be turned off in order to reduce the power consumption (the value of P2 is, for example, 18.7 W based on a calculation example of the first embodiment).

The values of P1 and P2 do not always match each other. This means that the "output power at which the ON/OFF of the PFC circuit 301 is required to be switched" and the "output power at which the ON/OFF of the relay 104 of the inrush current prevention circuit 300 is required to be switched" of the low power supply differ from each other.

Further, the output power of the low power supply 200 does not successively take any value, and has a fixed value to some extent in accordance with the operation mode of the image forming apparatus.

In this case, the output power of the low power supply in the sleep mode, the output power of the low power supply in the standby mode, and the output power of the low power supply in the print mode are represented by Psleep, Pstandby, and Pprint, respectively, and the magnitude relationship of the output power is assumed to be Psleep<Pstandby<Pprint. Further, the magnitude relationship of the values of P1, P2, Psleep, Pstandby, and Pprint is assumed to be a relationship represented in the horizontal axis of FIG. 10.

In this case, at the time of the sleep mode, it is desireable that the PFC circuit 301 and the relay 104 of the inrush current prevention circuit 300 are both turned off. Further, it is understood that, at the time of the standby mode and the print mode, it is desireable that both the PFC circuit 301 and the relay 104 of the inrush current prevention circuit 300 are turned on. That is, although the values of P1 and P2 differ from each other, the relationship of the ON/OFF of the PFC circuit 301 and the ON/OFF of the relay 104 of the inrush current prevention circuit 300 is the same in each operation mode of the image forming apparatus.

Therefore, the ON/OFF of the PFC circuit 301 and the ON/OFF of the relay 104 of the inrush current prevention circuit 300 are not required to be controlled by different signals. That is, both of the PFC circuit 301 and the relay 104 of the inrush current prevention circuit 300 can be simultaneously controlled by one signal output from the main controller 119.

As described above, the image forming apparatus 900 according to the third embodiment controls the ON/OFF of the PFC circuit 301 and the ON/OFF of the relay 104 of the inrush current prevention circuit 300 by one signal to switch the ON/OFF based on the operation mode of the image forming apparatus. In this manner, the power loss caused in the inrush current prevention circuit 300 can be reduced.

Further, when the PFC circuit 301 is used in the low power supply 200, the switching of the ON/OFF of the PFC circuit 301 and the switching of the ON/OFF of the relay 104 of the inrush current prevention circuit 300 can be performed by the same signal. Therefore, as compared to the case in which the switching is controlled by different signals, the circuit can be downsized and the cost can be reduced.

The relationship among the operation mode of the image forming apparatus 900, the ON/OFF of the PFC circuit 301, and the ON/OFF of the relay 104 of the inrush current prevention circuit 300 is not limited to that in the correspondence table shown in FIG. 9.

For example, in FIG. 10, when Pstandby is less than both of P1 and P2, the PFC circuit 301 and the relay 104 of the inrush current prevention circuit 300 may be turned off even in the standby mode.

As described above, according to the present disclosure, the ON/OFF of the switch of the inrush current prevention circuit is switched based on the output power of the AC/DC power supply. In this manner, the power loss caused when the switch of the inrush current prevention circuit is kept in the ON state at the time when the output power of the AC/DC power supply is low can be reduced. Therefore, the power supply apparatus (AC/DC power supply) can further reduce the power consumption. As described above, according to the present disclosure, there is provided a power supply apparatus that is capable of saving power at the time of low output power even in a configuration using an inrush current prevention resistor and a switch as an inrush current prevention circuit in order to increase power of a low power supply.

The above-mentioned embodiments are given only for the purpose of describing the present disclosure more specifically; the scope of the present disclosure is not limited by the embodiments.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-115267, filed Jun. 12, 2017 which is hereby incorporated by reference herein in its entirety.

What is claimed is:

1. An image forming apparatus, which has a plurality of power modes having different levels of power consumption including a power saving mode for reducing power consumption, comprising:
    a power supply apparatus configured to convert an AC voltage input from an AC power supply into a DC voltage, with the power supply apparatus including:
        a rectifier configured to rectify the AC voltage;
        a capacitor configured to smooth a rectified voltage created by the rectifier;
        a current limiter configured to limit an inrush current input to the capacitor when the capacitor is charged;
        a switch connected in parallel to the current limiter, the switch being configured to be interrupted by supplying a current to the switch;
        a power factor correction circuit provided on an upstream side of the capacitor, the power factor correction circuit being configured to correct a power factor,
        a converter, which is connected at a subsequent stage of the capacitor and is configured to adjust the rectified voltage smoothed by the capacitor to a predetermined DC voltage; and
        a controller operated by an output of the convertor, the controller being configured to control whether to enable the power factor correction circuit based on a power mode of the plurality of power modes and whether to enable the current limiter by setting the switch to either an ON state or an OFF state based on the power mode of the plurality of power modes the controller being configured to:
            output an ON/OFF control signal that is common to the power factor correction circuit and the current limiter to disable the power factor correction circuit and to enable the current limiter in a first case where a power mode of the image forming apparatus is a first power mode as the power saving mode, and
            output the ON/OFF control signal that is common to the power factor correction circuit and the current limiter to enable the power factor correction circuit and to disenable the current limiter in a second case where the power mode of the image forming apparatus is a second power mode that has power consumption larger than power consumption of the first power mode,
    wherein a first power is supplied both in the first power mode and in the second power mode from the AC power supply to the power supply apparatus, and the power supply apparatus consumes the supplied the first power both in the first power mode and in the second power mode.

2. The image forming apparatus according to claim 1, wherein, in the first case where the power mode of the image forming apparatus is the the first mode, the controller outputs the ON/OFF control signal such that the switch is set to the OFF state, to thereby enable the current limiter.

3. The image forming apparatus according to claim 1, wherein the current limiter is a resistor connected in series to a power supply line of a rectified current rectified by the rectifier.

* * * * *